United States Patent
Fujii

(10) Patent No.: US 8,977,044 B2
(45) Date of Patent: Mar. 10, 2015

(54) IMAGE PROCESSING APPARATUS FOR AREA SEPARATION OF IMAGES, IMAGE PROCESSING METHOD, AND COMPUTER READABLE MEDIUM

(75) Inventor: Koichi Fujii, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 582 days.

(21) Appl. No.: 13/237,612

(22) Filed: Sep. 20, 2011

(65) Prior Publication Data

US 2012/0213431 A1    Aug. 23, 2012

(30) Foreign Application Priority Data

Feb. 18, 2011   (JP) ................................. 2011-032807

(51) Int. Cl.
*G06K 9/00* (2006.01)
*G06K 9/34* (2006.01)
*G06K 9/46* (2006.01)

(52) U.S. Cl.
CPC ................................. *G06K 9/00456* (2013.01)
USPC ............ 382/164; 382/165; 382/173; 382/203

(58) Field of Classification Search
None
See application file for complete search history.

(56) References Cited

U.S. PATENT DOCUMENTS

| | | | |
|---|---|---|---|
| 5,548,346 A * | 8/1996 | Mimura et al. ............... | 348/738 |
| 6,941,014 B2 * | 9/2005 | Lin et al. ....................... | 382/176 |
| 2002/0031246 A1 * | 3/2002 | Kawano ....................... | 382/132 |
| 2006/0104525 A1 * | 5/2006 | Gringeler et al. ............. | 382/239 |
| 2007/0053596 A1 * | 3/2007 | Yokose .......................... | 382/239 |
| 2008/0013835 A1 * | 1/2008 | Kondo et al. ................. | 382/199 |
| 2010/0171999 A1 * | 7/2010 | Namikata et al. ............. | 358/530 |

FOREIGN PATENT DOCUMENTS

| | | | |
|---|---|---|---|
| JP | 2000-222564 A | | 8/2000 |
| JP | 2004-062459 A | | 2/2004 |
| JP | 2004-110434 A | | 4/2004 |
| JP | 2004-118717 A | | 4/2004 |

\* cited by examiner

*Primary Examiner* — Bernard Krasnic
(74) *Attorney, Agent, or Firm* — Sughrue Mion, PLLC

(57) ABSTRACT

An image processing apparatus includes a receiving unit that receives an image; a separating unit that separates a first area from the received image; an extracting unit that extracts a second area of a color having a predetermined relationship in the separated first area; an acquiring unit that acquires the characteristic relating to the shape of the extracted second area; a first determining unit that determines whether or not the second area is plain, on the basis of the acquired characteristic; and a second determining unit that determines, as the property of the first area, whether the first area is a continuous-tone area, a plain area, or a composite area including a continuous-tone area and a plain area, on the basis of the ratio of the second area determined to be plain to the separated first area.

8 Claims, 15 Drawing Sheets

FIG. 5A1
FIG. 5A2
FIG. 5A3
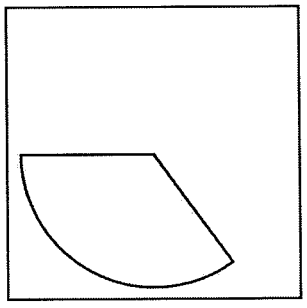
FIG. 5B1
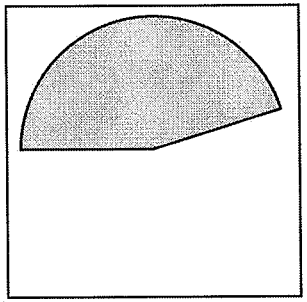
FIG. 5B2
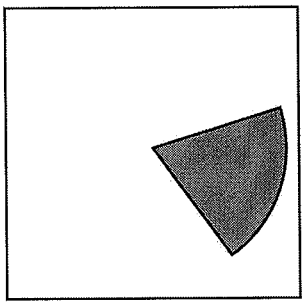
FIG. 5B3
EXTRACT UNIFORM-COLOR AREA
FIG. 5A
FIG. 5B

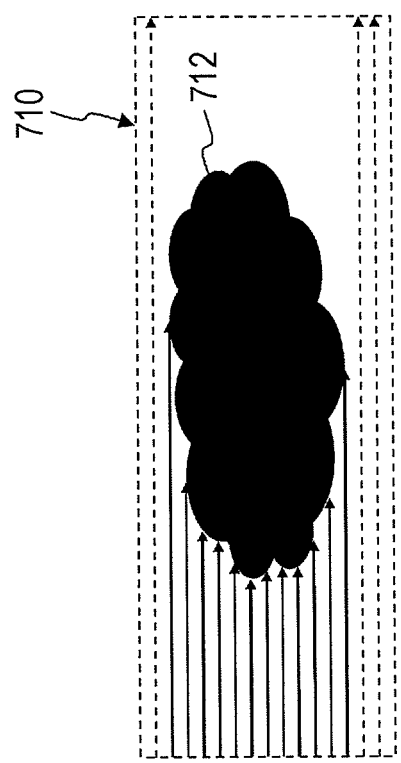

IMAGE PROCESSING APPARATUS FOR AREA SEPARATION OF IMAGES, IMAGE PROCESSING METHOD, AND COMPUTER READABLE MEDIUM

CROSS-REFERENCE TO RELATED APPLICATIONS

This application is based on and claims priority under 35 USC 119 from Japanese Patent Application No. 2011-032807 filed Feb. 18, 2011.

BACKGROUND (i) Technical Field

The present invention relates to an image processing apparatus, an image processing method, and a computer readable medium.

(ii) Related Art

Techniques relating to area separation of images are available.

SUMMARY

According to an aspect of the invention, there is provided an image processing apparatus including a receiving unit, a separating unit, an extracting unit, an acquiring unit, a first determining unit, and a second determining unit. The receiving unit receives an image. The separating unit separates a first area from the image received by the receiving unit. The extracting unit extracts a second area of a color having a predetermined relationship in the first area separated by the separating unit. The acquiring unit acquires the characteristic relating to the shape of the second area extracted by the extracting unit. The first determining unit determines whether or not the second area is plain, on the basis of the characteristic acquired by the acquiring unit. The second determining unit determines, as the property of the first area, whether the first area is a continuous-tone area, a plain area, or a composite area including a continuous-tone area and a plain area, on the basis of the ratio of the second area determined to be plain by the first determining unit to the first area separated by the separating unit.

BRIEF DESCRIPTION OF THE DRAWINGS

Exemplary embodiment(s) of the present invention will be described in detail based on the following figures, wherein:

FIGS. 5A, 5A1, 5A2, and 5A3 and FIGS. 5B, 5B1, 5B2, and 5B3 are explanatory diagrams illustrating an example of processing performed by a uniform-color area extraction module;

FIGS. 8A and 8B are explanatory diagrams illustrating an example of the processing performed by the shape characteristic acquisition module;

DETAILED DESCRIPTION

Exemplary embodiments of the invention will be explained below with reference to the drawings.

Figure 1:
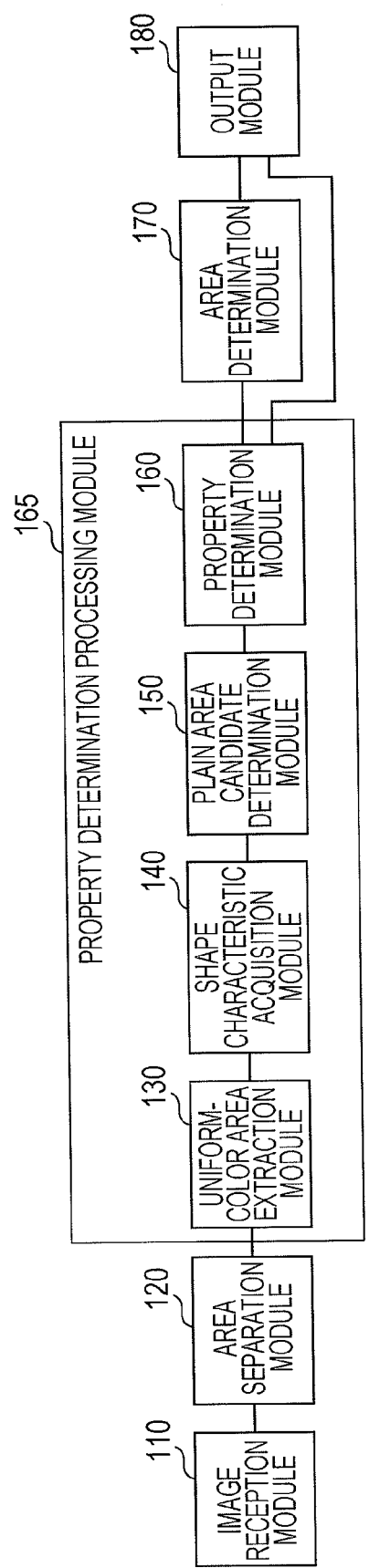
FIG. 1 is a schematic diagram illustrating an example of the module configuration according to a first exemplary embodiment.

FIG. 1 is a schematic diagram illustrating an example of the module configuration according to a first exemplary embodiment.

The term "module" generally represents a component such as software (a computer program), hardware, or the like, which can be logically separated. Thus, modules in the exemplary embodiments represent modules in a hardware configuration as well as modules in a computer program. Therefore, the exemplary embodiments also provide explanations of computer programs for causing the components to function as modules (including a program causing a computer to execute various procedures, a program causing a computer to function as various units, and a program causing a computer to implement various functions), systems, and methods. For the sake of a clear explanation, the terms "store" and "cause something to store" and other equivalent expressions are used. In a case where an exemplary embodiment concerns a computer program, these terms and expressions mean "causing a storage device to store" or "controlling a storage device to store". In addition, a module may correspond to a function in a one-to-one relationship. However, for implementation, a single module may be implemented by a single program, plural modules may be implemented by a single program, or a single module may be implemented by plural programs. Furthermore, plural modules may be executed by a single computer or a single module may be executed by plural computers in a distributed or parallel environment. One module may include another module. Hereinafter, the term "connection" means logical connection (exchange of data, instruction, cross-reference between data, and the like) as well as physical connection. The term "predetermined" means set before a target process is performed. Being "predetermined" means not only being set before processing in an exemplary embodiment starts but also being set even after the processing in the exemplary embodiment starts, in accordance with the condition and state at that time or in accordance with the condition and state of a period until that time, as long as before the target process is performed.

A "system", an "apparatus", or a "device" may be implemented by a single computer, hardware, apparatus, or the like as well as by plural computers, hardware, apparatuses, or the like connected using a communication unit such as a network (including communication connection in a one-to-one correspondence). The term "apparatus" or "device" is used as a synonym for the term "system". Obviously, the term "system" does not include merely a social "mechanism" (social system), which is an artificial arrangement.

For each process in a module or for individual processes in a module performing plural processes, target information is read from a storage device and the result of the process is written to the storage device after the process is performed. Thus, the explanation of reading from the storage device before the process is performed or the explanation of writing to the storage device after the process is performed may be omitted. The storage device may be a hard disk, a random-access memory (RAM), an external storage medium, a storage device using a communication line, a register inside a central processing unit (CPU), or the like.

An image processing apparatus according to a first exemplary embodiment detects a composite area including a continuous-tone area (hereinafter, also referred to as a photograph area as a specific exemplification) and a plain area, and identifies the continuous-tone area and the plain area from the composite area. The term "plain area" represents an area including a partial area which is "plain", and an area having a uniform color and whose shape is not complicated is referred to as a "plain" area. As illustrated in FIG. 1, the image processing apparatus includes an image reception module 110, an area separation module 120, a property determination processing module 165, an area determination module 170, and an output module 180. The property determination processing module 165 includes a uniform-color area extraction module 130, a shape characteristic acquisition module 140, a plain area candidate determination module 150, and a property determination module 160.

The image reception module 110 is connected to the area separation module 120. The image reception module 110 receives a target image and transmits the received image to the area separation module 120. "Receiving an image" includes, for example, reading an image using a scanner, a camera, or the like, receiving an image using a facsimile machine or the like from an external apparatus via a communication line, reading an image stored in a hard disk or the like (including a recording medium connected via a network or the like as well as a recording medium arranged inside a computer), and the like. An image may be a binary image or a multi-level image (including a color image). In the explanation provided below, a color image is provided as an exemplification. A single image may be received or plural images may be received. The content of an image may be a business document, an advertising brochure, or the like.

Figure 3:
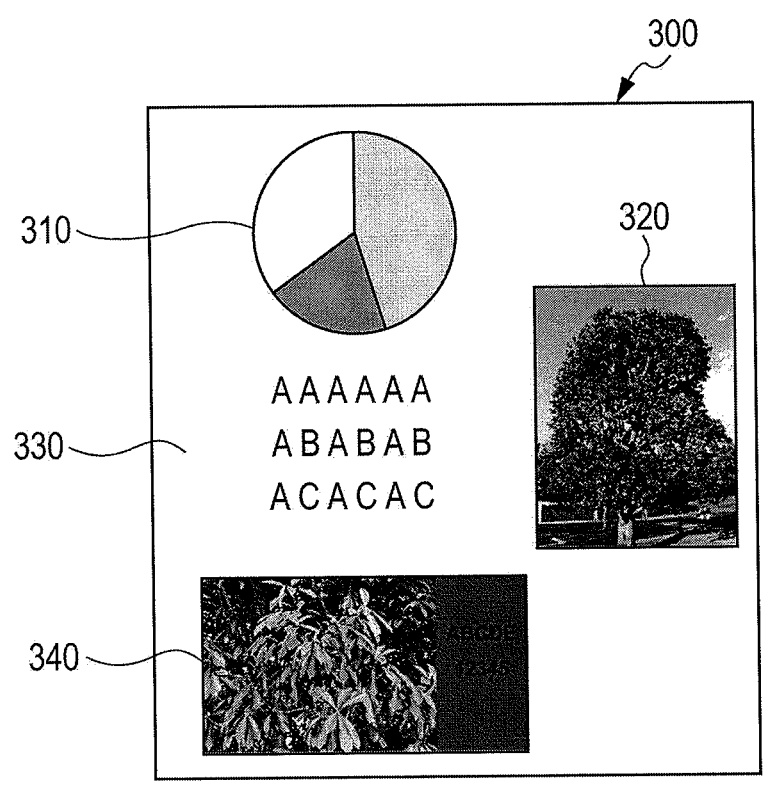
FIG. 3 illustrates an example of a target image received by an image reception module.

FIG. 3 illustrates an example of a target image 300 received by the image reception module 110. The target image 300 contains areas 310, 320, 330, and 340.

The area separation module 120 is connected to the image reception module 110 and the uniform-color area extraction module 130. The area separation module 120 separates a first area from the image received by the image reception module 110. The first area is an area of an image suitable for being expressed as a multi-level image (including a color image) or a binary image using a screen or the like. The first area is an area of, for example, a natural image such as a photograph, an artificial image typified by a CG image such as a colored graph, or a composite image composed of a natural image and an artificial image. The first area is referred to as a picture area. An image area other than the first area is an area of an image suitable for being expressed as a binary image (however, may be a color image). The image area other than the first area corresponds to an image area including, for example, a character, a table, a drawing, or the like.

In the example illustrated in FIG. 3, each of the areas 310, 320, and 340 in the target image 300 corresponds to the first area. The area 310 includes a colored graph, the area 320 includes a photograph image, and the area 340 includes a composite image including a photograph image and a CG image. The area 330 composed of characters is not separated as a first area from the target image 300.

A known image separation technique may be used as a separation method. For example, by analyzing the distribution of pixel values or the like, a rectangular area of a multi-level image portion may be extracted as a first area.

The first area may include a composite image including a natural image and an artificial image such as a CG image. In general, a natural image such as a photograph is an area of an image having continuous tones and an artificial image such as a CG image is an area of an image having a uniform color. However, in a case where an image is read using a scanner or the like, even the pixel values of a uniform-color image such as an artificial image are varied due to the influence of noise or the like. In order to extract an artificial image on the basis of the characteristic of a uniform color, an area having pixel values within a predetermined range is regarded as being an area of a uniform-color image. In such a case, an area of an image having a uniform color is generated also in a natural image such as a photograph. However, a uniform-color image of a natural image such as a photograph is generally complicated compared to an artificial image, and a uniform-color image of an artificial image such as a CG image is generally simple (for example, the outline is a straight line, a circular arc, or the like, in many cases) compared to a natural image.

The uniform-color area extraction module 130 is connected to the area separation module 120 and the shape characteristic acquisition module 140. The uniform-color area extraction module 130 extracts a second area of a color having a predetermined relationship within the first area separated by the area separation module 120. The term "color having a predetermined relationship" means a uniform color in the exemplary embodiment. The second area is included in the first area (the second area may be identical to the first area) and is an image having a uniform color. An image having a uniform color may be an image whose pixel values fall within a predetermined range as well as an image whose pixel values are the same. For example, a target area may be extracted by detecting a main color in the first area and performing binarization using the main color. An area including continuous pixels having pixel values within a predetermined range may be extracted using a labeling technique. In detection of a main color, for example, a color whose number of pixels is equal to or greater than a predetermined number of pixels (pixel values within a predetermined range, the same applies to the following descriptions), a color whose number of pixels is equal to or greater than a predetermined ratio, a color whose number of pixels falls within predetermined positions in the descending order of the number of pixels, or the like is detected. In addition, based on the projection distribution of pixel values, a portion exhibiting a larger distribution may be extracted. Furthermore, an area growth method for defining a pixel in a first area as a start point, detecting a difference between the pixel value of the pixel and the pixel value of a neighboring pixel, comparing the difference between the pixel values with a predetermined value, and connecting the pixels in a case where the difference and the predetermined value has a predetermined relationship (for example, in a case where the difference is smaller than or equal to the predetermined value (or smaller than the predetermined value)) may be used. A specific example will be described later with reference to FIGS. 6A, 6B, 6C, and 6D.

Although the second area is an area of a uniform-color image, the second area may be generated within an image having continuous tones such as a photograph.

The shape characteristic acquisition module 140 is connected to the uniform-color area extraction module 130 and the plain area candidate determination module 150. The shape characteristic acquisition module 140 acquires the characteristic relating to the shape of the second area extracted by the uniform-color area extraction module 130. The shape characteristic acquisition module 140 may acquire the characteristic relating to the shape of the second area on the basis of the distance between neighboring peripheral pixels forming the outer periphery of the second area extracted by the uniform-color area extraction module 130. For example, in a case where scanning is performed on the second area vertically and horizontally, the distance from a scanning start point to the first pixel is obtained, and a difference between neighboring distances is calculated so that the characteristic relating to the shape of the second area can be obtained. A specific example will be described later with reference to FIGS. 7A and 7B and FIGS. 8A and 8B.

The plain area candidate determination module 150 is connected to the shape characteristic acquisition module 140 and the property determination module 160. The plain area candidate determination module 150 determines whether or not the second area is plain on the basis of the characteristic acquired by the shape characteristic acquisition module 140. A plain area includes at least an area including a CG image or the like. Part of an image having continuous tones such as a photograph may be included in a plain area. A specific example will be described later with reference to FIG. 9.

The property determination module 160 is connected to the plain area candidate determination module 150, the area determination module 170, and the output module 180. The property determination module 160 determines, as the property of the first area, whether the first area is a continuous-tone area, a plain area, or a composite area including a continuous-tone area and a plain area, on the basis of the ratio of the second area that is determined to be plain by the plain area candidate determination module 150 to the first area separated by the area separation module 120. Here, the ratio indicates the value obtained when the dimension of the first area is taken as a denominator and the dimension of the second area that is determined to be plain in the first area is taken as a numerator. The ratio is compared with a predetermined first value and a predetermined second value. If a predetermined first relationship is found (for example, the ratio is smaller than or equal to the predetermined first value (or smaller than the predetermined first value)), the first area may be determined, as the property, to be a continuous-tone area. If a predetermined second relationship is found (for example, the ratio is equal to or greater than the predetermined second value (or greater than the predetermined second value)), the first area may be determined, as the property, to be a plain area. If a predetermined third relationship is found (for example, the ratio is equal to or greater than the predetermined first value (or greater than the predetermined first value) and smaller than or equal to the predetermined second value (or smaller than the predetermined second value)), the first area may be determined, as the property, to be a composite area including a continuous-tone area and a plain area. A specific example will be described later with reference to FIG. 10.

The property determination module 160 may extract the likelihood of the first area being a continuous-tone area or being a plain area. The property determination module 160 may determine, as the property of the first area, whether the first area is a continuous-tone area, a plain area, or a composite area including a continuous-tone area and a plain area, on the basis of the likelihood of being a continuous-tone area or the likelihood of being a plain area and the ratio of the second area.

The area determination module 170 is connected to the property determination module 160 and the output module 180. The area determination module 170 identifies a continuous-tone area or a plain area in the area determined by the property determination module 160 to be a composite area including a continuous-tone area and a plain area. For an area in the first area determined to be a composite area including a continuous-tone area and a plain area, information indicating a continuous-tone area or information indicating a plain area is generated. For example, a continuous-tone area or a plain area may be identified using information for masking the first area. A specific example will be described later with reference to FIG. 4.

The output module 180 is connected to the property determination module 160 and the area determination module 170. The output module 180 outputs the result of processing performed by the property determination module 160 (the property of the first area (a continuous-tone area, a plain area, or a composite area including a continuous-tone area and a plain area)) and the result of processing performed by the area determination module 170 (information identifying a continuous-tone area or a plain area in a composite area including a continuous-tone area and a plain area). The term "output" includes, for example, printing the processing result using a printing apparatus such as a printer, displaying the processing result on a display apparatus such as a display, storing the processing result on a storage medium such as a memory card, transmitting the processing result to an external information processing apparatus, and the like. For example, the external information processing apparatus that receives the processing result extracts characters, while switching the method for extracting characters between a plain area and a continuous-tone area, and performs compression, image processing, and adjustment of image quality, in accordance with the characteristics of the area.

In the first exemplary embodiment, the area determination module 170 is not necessarily provided. In this case, the output module 180 outputs the result of processing performed by the property determination module 160.

Figure 2:
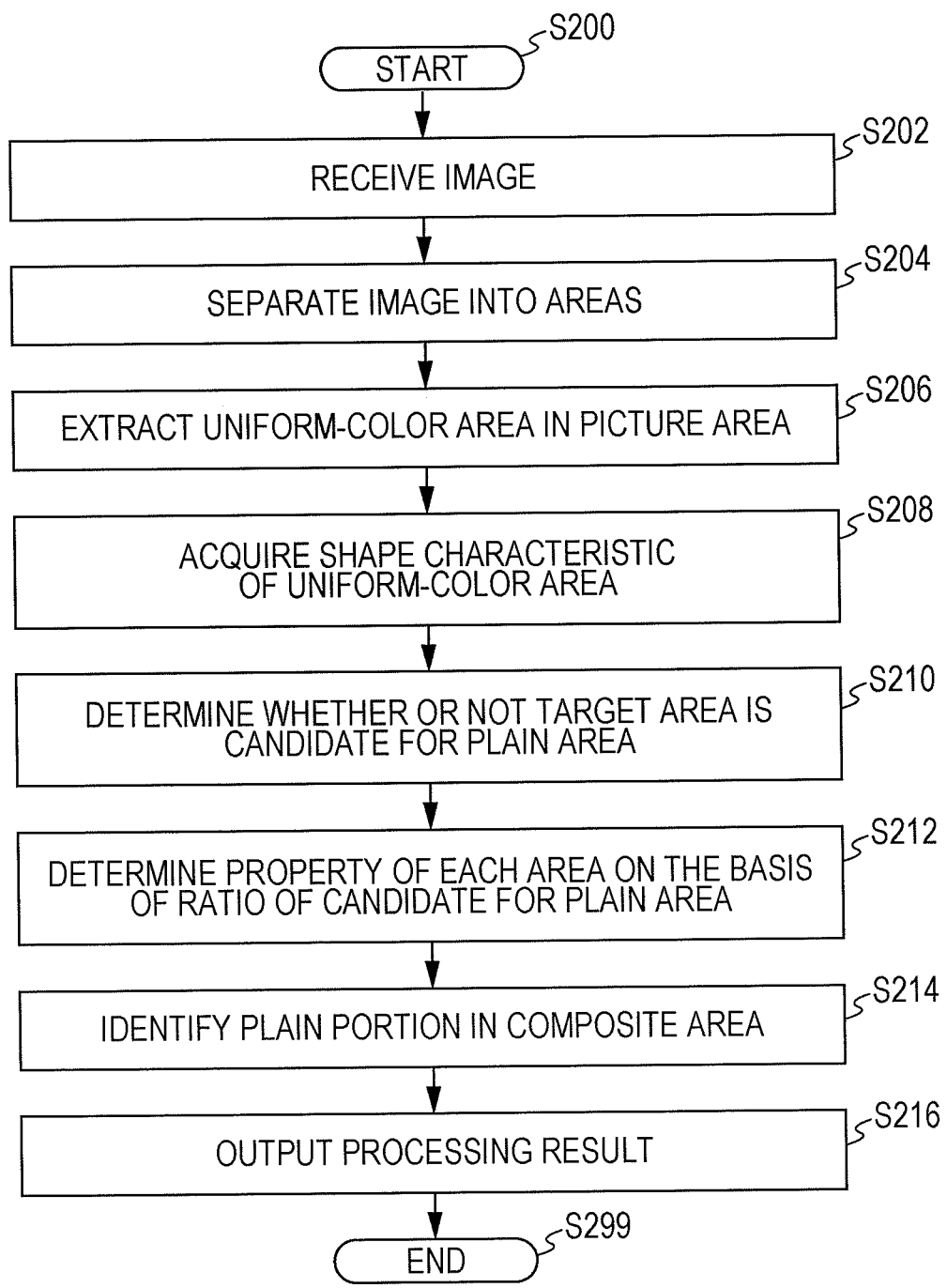
FIG. 2 is a flowchart illustrating an example of a process according to the first exemplary embodiment.

FIG. 2 is a flowchart illustrating an example of a process according to the first exemplary embodiment.

In step S200, the process starts. In step S202, the image reception module 110 receives an image. For example, the image reception module 110 receives the target image 300 illustrated in FIG. 3.

Figure 4:
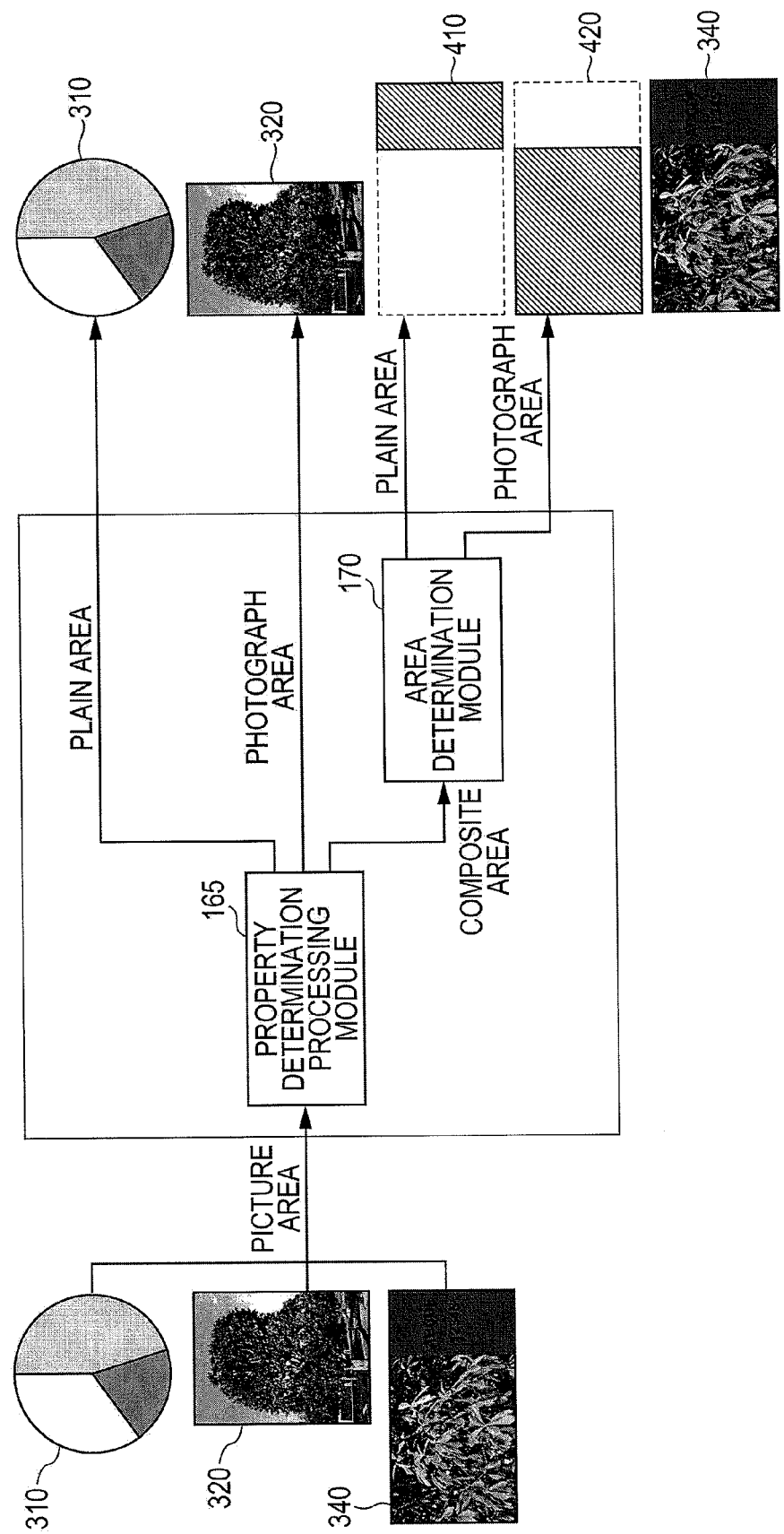
FIG. 4 is an explanatory diagram illustrating an example of the overview of the process according to the first exemplary embodiment.

In step S204, the area separation module 120 separates the image into areas. For example, the area separation module 120 separates the areas 310, 320, and 340, which are picture areas, from the target image 300. For example, the areas 310, 320, and 340 illustrated in FIG. 4 serve as targets in the process describe below. FIG. 4 is an explanatory diagram illustrating an example of the overview of the process according to the first exemplary embodiment.

Figure 6C:
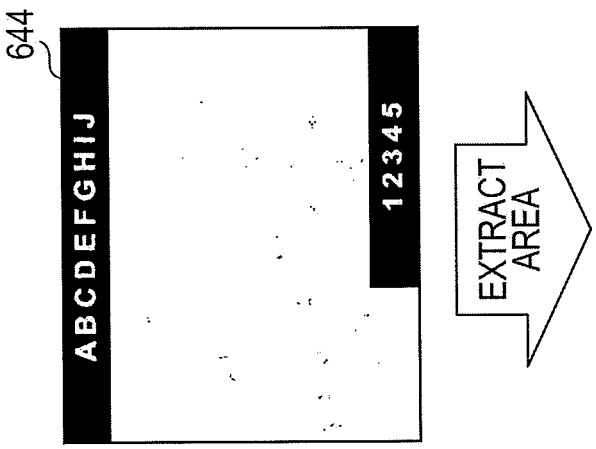
FIGS. 6A, 6B, 6C, and 6D are explanatory diagrams illustrating an example of the processing performed by the uniform-color area extraction module.
Figure 6D:
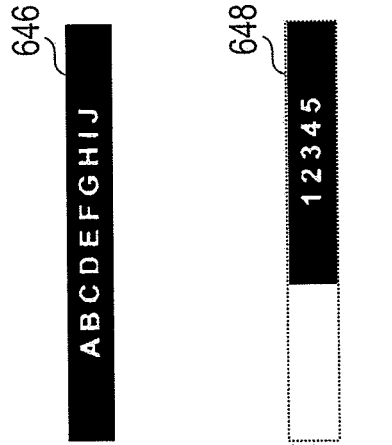
Figure 6B:
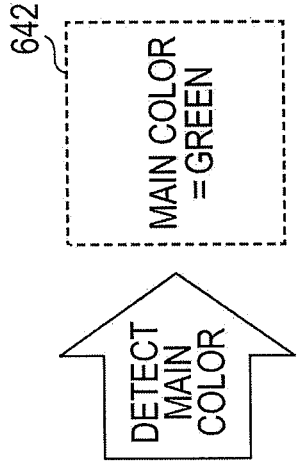
Figure 6A:

In step S206, the uniform-color area extraction module 130 extracts a uniform-color area in the picture area. The extraction processing will be explained with reference to FIGS. 5A, 5A1, 5A2, and 5A3, FIGS. 5B, 5B1, 5B2, and 5B3, and FIGS. 6A, 6B, 6C, and 6D. FIGS. 5A, 5A1, 5A2, and 5A3, FIGS. 5B, 5B1, 5B2, and 5B3, and FIGS. 6A, 6B, 6C, and 6D are explanatory diagrams illustrating an example of processing performed by the uniform-color area extraction module 130. For example, for the area 320 illustrated in FIG. 5A, areas illustrated in FIGS. 5A1, 5A2, and 5A3 are extracted. In FIG. 5A1, the main color is blue. In FIG. 5A2, the main color is white. In FIG. 5A3, the main color is green. For example, for the area 310 illustrated in FIG. 5B, areas illustrated in FIGS. 5B1, 5B2, and 5B3 are extracted. In FIG. 5B1, the main color is red. In FIG. 5B2, the main color is blue. In FIG. 5B3, the main color is yellow. In addition, for example, for the area 340 illustrated in FIG. 6A, as the result of detection of a main color, a main-color detection result 642 indicating that the main color is green is obtained, as illustrated in FIG. 6B. Then, a binarizing process is performed using the detected main color, and a binarized image 644 is generated, as illustrated in FIG. 6C. Area extraction is performed for the binarized image 644, and connected areas 646 and 648 are generated, as illustrated in FIG. 6D. In the area extraction, projection distribution is generated in the vertical and horizontal directions, and a portion exhibiting a larger distribution is extracted as a uniform-color area. In the example illustrated in FIG. 6D, two portions exhibit larger projection distributions in the horizontal direction. Therefore, the portions (the connected areas 646 and 648) are extracted.

The uniform-color area extracted here may be an area having a uniform color or a rectangle circumscribing the area having a uniform color.

Figure 7B:
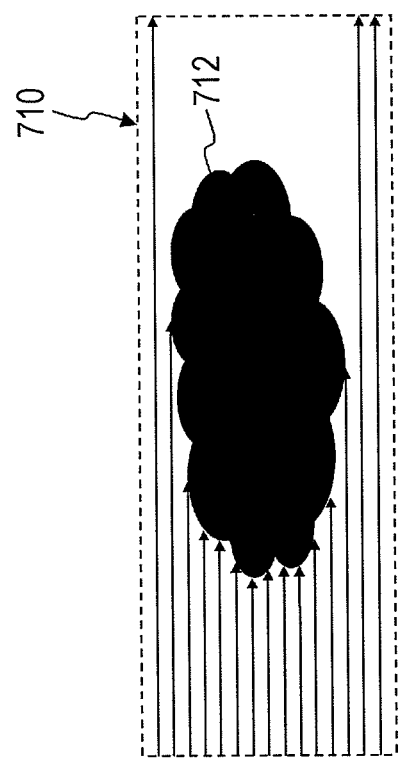
FIGS. 7A and 7B are explanatory diagrams illustrating an example of processing performed by a shape characteristic acquisition module.
Figure 7A:

In step S208, the shape characteristic acquisition module 140 acquires the shape characteristic 712 and 722 of the uniform-color area 710 and 720. A process for acquiring the shape characteristic will be explained with reference to FIGS. 7A and 7B and FIGS. 8A and 8B. FIGS. 7A and 7B and FIGS. 8A and 8B are explanatory diagrams illustrating an example of processing performed by the shape characteristic acquisition module 140. The distance from the upper end, lower end, leftmost end, and rightmost end of each of the extracted uniform-color areas 710 and 720 (or circumscribing rectangles) to the first pixel is calculated. In a scanning operation i, distances from individual ends, "out_u[i]" (the distance obtained by scanning performed in the downward direction from the upper end), "out_lo[i]" (the distance obtained by scanning performed in the upward direction from the lower end), "out_l[i]" (the distance obtained by scanning performed in the rightward direction from the leftmost end), and "out_r[i]" (the distance obtained by scanning performed in the leftward direction from the rightmost end), are obtained. FIG. 7A illustrates an example of the distance "out_l[i]", and FIG. 7B illustrates an example of the distance "out_u[i]".

Next, except for a scanning operation in which no pixel exists in a range from the scanning start end to the opposite end, a difference between the distances in neighboring scanning operations is calculated. In the example illustrated in FIGS. 8A and 8B, dotted lines represent examples of scanning operations in which no pixel exists in a range from the scanning start end to the opposite end, and solid lines represent examples of scanning operations for calculating a difference between the distances. In a scanning operation i, "diff_out_u[i]" represents a difference between the distances in neighboring scanning operations in the upward direction, "diff_out_lo[i]" represents a difference between the distances in neighboring scanning operations in the downward direction, "diff_outl[i]" represents a difference between the distances in neighboring scanning operations in the leftward direction, and "diff_out_r[i]" represents a difference between the distances in neighboring scanning operations in the rightward direction. The differences "diff_out_u[i]", "diff_out_lo[i]", "diff_out_l[i]", and "diff_out_r[i]" are defined as the shape characteristics of a uniform-color area:

$$\text{diff\_out\_}u[i]=\text{abs}(\text{out\_}u[i]-\text{out\_}u[i+1])$$

$$\text{diff\_out\_}lo[i]=\text{abs}(\text{out\_}lo[i]-\text{out\_}lo[i+1])$$

$$\text{diff\_out\_}l[i]=\text{abs}(\text{out\_}l[i]-\text{out\_}l[i+1])$$

$$\text{diff\_out\_}r[i]=\text{abs}(\text{out\_}r[i]-\text{out\_}r[i+1]),$$

where an "abs ( )" function represents a function used for obtaining an absolute value.

In a case where a circumscribing rectangle is extracted as a uniform-color area using a labeling method, a state where no pixel exists in a range from the scanning start end to the opposite end does not occur. On the contrary, in a case where a circumscribing rectangle is extracted using a projection method or the like, a state where no pixel exists in a range from the scanning start end to the opposite end may occur.

In step S210, the plain area candidate determination module 150 determines whether or not the uniform-color area is a candidate for a plain area. More specifically, the plain area candidate determination module 150 determines whether or not the uniform-color area is a candidate for a plain area on the basis of the characteristic amount (diff_out_u[i], diff_out_lo[i], diff_out_l[i], and diff_out_r[i]) acquired in step S208.

Figure 9:
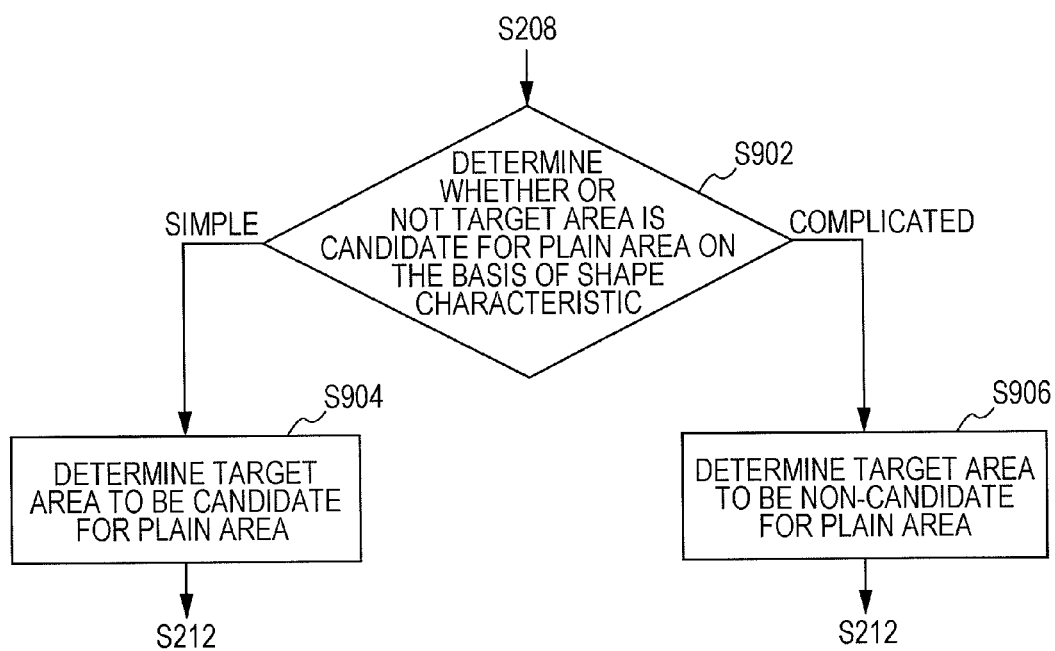
FIG. 9 is a flowchart illustrating an example of a process performed by a plain area candidate determination module.

FIG. 9 is a flowchart illustrating an example of a process performed by the plain area candidate determination module 150.

In step S902, the plain area candidate determination module 150 determines whether or not the uniform-color area is a candidate for a plain area on the basis of the shape characteristics. If the determination in step S902 is simple, the process proceeds to step S904. If the determination in step S902 is complicated (in a case where it is determined that the uniform-color area is not a candidate for a plain area), the process proceeds to step S906.

In step S904, the uniform-color area is defined as a candidate for a plain area. Then, the process proceeds to step S212.

In step S906, the uniform-color area is defined as a non-candidate for a plain area. Then, the process proceeds to step S212.

Specific examples of the processing in step S902 will be described below.

(A) In the upward, downward, leftward, and rightward directions, calculate the average values of "diff_out_xx" (xx: u, lo, l, r).

The obtained values are expressed as "diff_out_ave_u", "diff_out_ave_lo", "diff_out_ave_l", and "diff_out_ave_r".

(B) In the upward, downward, leftward, and rightward directions, calculate the ratio of "diff_out_xx[i]" being smaller than or equal to a predetermined value (or smaller than the predetermined value).

The obtained values are expressed as "diff_out_under_n_ratio_u", "diff_out_under_n_ratio_lo", "diff_out_under_n_ratio_l", and "diff_out_under_n_ratio_r".

Eight types of characteristic amount may be calculated using plural predetermined values, (for example, 5 and 10, or the like).

(C) Add the values in all directions and calculate the average.

The obtained value is expressed as "diff_out_ave".

(D) In the upward, downward, leftward, and rightward directions, calculate the ratio of two consecutive pixels having a value "diff_out_xx[i]" of 0.

The obtained values are expressed as "diff_out_zero_ratio_u", "diff_out_zero_ratio_lo", "diff_out_zero_ratio_l", and "diff_out_zero_ratio_r".

In the examples (A), (B), and (D), values in the upward, downward, leftward, and rightward directions may be collected together to be treated as a single characteristic amount.

In the processing examples (A), (B), (C), and (D), the following relationships are obtained.

(A1) If the value "diff_out_ave_xx" is smaller than or equal to a predetermined value (or smaller than the predetermined value), the area is highly likely to be plain.

(B1) If the value "diff_out_under_n_ratio_xx" is equal to or greater than a predetermined value (or greater than the predetermined value), the area is highly likely to be plain.

(C1) If the value "diff_out_ave" is smaller than or equal to a predetermined value (or smaller than the predetermined value), the area is highly likely to be plain.

(D1) If the value "diff_out_zero_ratio_xx" is equal to or greater than a predetermined value (or greater than the predetermined value), the area is highly likely to be plain.

The determination of whether or not the uniform-color area is a candidate for a plain area may be made on the basis of one of the types of characteristic amount obtained in the processing examples (A) to (D). Alternatively, the determination may be made on the basis of the combination of two or more types of characteristic amount. In a case where the determination is made on the basis of one type of characteristic amount, the area that is determined to be highly likely to be plain on the basis of a corresponding one of the relationships (A1) to (D1) may be determined to be a candidate for a plain area.

The determination may be made as described below.

If each of the minimum ratio values in the upward, downward, leftward, and rightward directions obtained in the processing example (B) is equal to or greater than the predetermined value (or greater than the predetermined value), the uniform-color area is determined to be a candidate for a plain area.

If the average value obtained in the processing example (C) is smaller than or equal to the predetermined value (or smaller than the predetermined value), the uniform-color area is determined to be a candidate for a plain area.

If the maximum value obtained in the processing example (A) is smaller than or equal to the predetermined value (or smaller than the predetermined value) and the maximum value obtained in the processing example (B) is equal to or greater than the predetermined value (or greater than the predetermined value), the uniform-color area is determined to be a candidate for a plain area.

If the values obtained by the processing examples (A) to (D) have predetermined relationships (the area is determined to be highly likely to be plain on the basis of the relationships (A1) to (D1)), the uniform-color area is determined to be a candidate for a plain area.

If each of the values obtained in the examples (A) and (B) does not satisfy the predetermined relationships (the area is not determined to be highly likely to be plain on the basis of the relationships (A1) and (B1)) but the values are equal to predetermined values or fall within predetermined ranges and each of the values obtained in the example (D) is equal to or greater than the predetermined value (or greater than the predetermined value), the uniform-color area is determined to be a candidate for a plain area. Here, the expression "values are equal to predetermined values or fall within predetermined ranges" means a case where the values obtained in the processing examples (A) and (B) do not somewhat satisfy the relationships (A1) and (B1).

In step S212, the property determination module 160 determines the property of each area on the basis of the ratio of a candidate for a plain area. More specifically, the property determination module 160 determines, as the property of the first area, whether the first area is a continuous-tone area, a plain area, or a composite area including a continuous-tone area and a plain area, in accordance with the ratio of the dimension of the candidate for a plain area to the dimension of the uniform-color area extracted in step S206.

Figure 10:
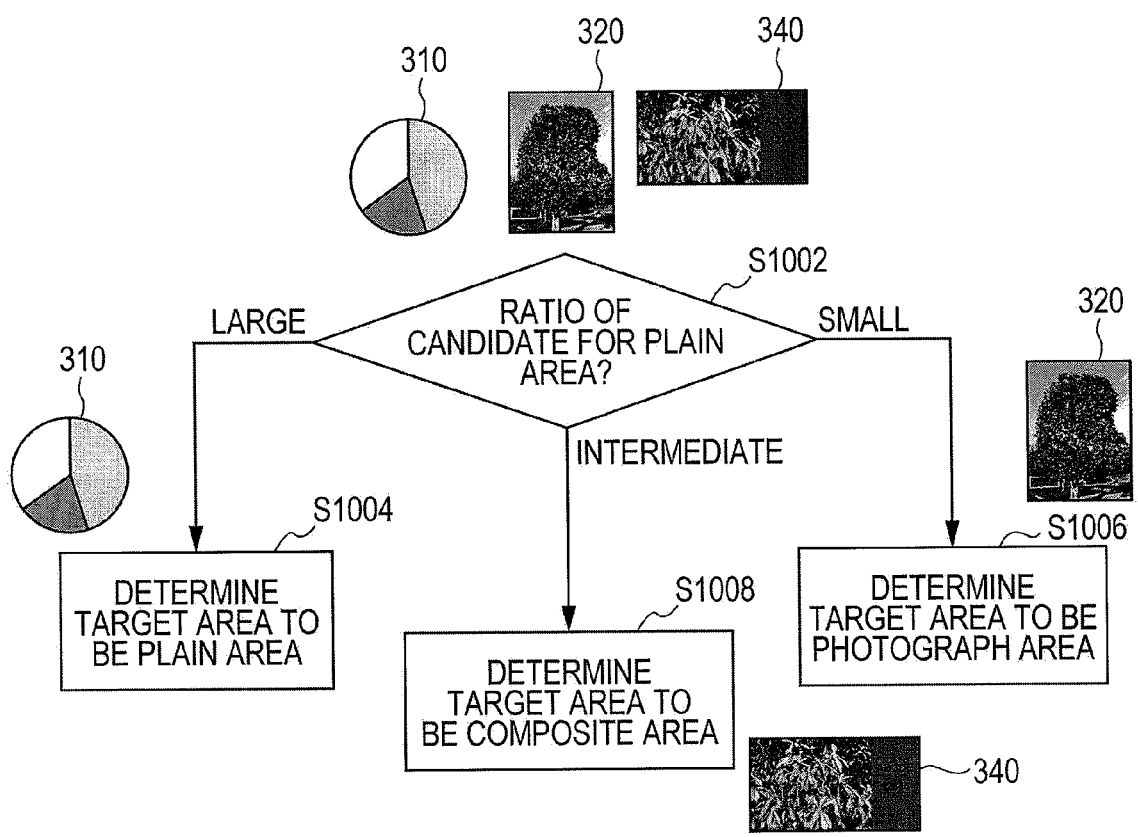
FIG. 10 is a flowchart illustrating an example of a process performed by a property determination module.

FIG. 10 is a flowchart illustrating an example of the process performed by the property determination module 160.

In step S1002, a determination is made on the basis of the ratio of the dimension of the candidate for a plain area to the uniform-color area. If it is determined in step S1002 that the ratio is equal to or greater than a predetermined value (a first threshold) (or greater than the predetermined value), the process proceeds to step S1004. If it is determined in step S1002 that the ratio is at an intermediate level (if the result does not correspond to step S1004 or S1006), the process proceeds to step S1008. If it is determined in step S1002 that the ratio is smaller than or equal to a predetermined value (a second threshold) (or smaller than the predetermined value), the process proceeds to step S1006.

In step S1004, the target area is determined to be a plain area.

In step S1006, the target area is determined to be a photograph area.

In step S1008, the target area is determined to be a composite area.

In the example described above, the area 310 is determined, as the property, to be a plain area, the area 320 is determined, as the property, to be a photograph area, and the area 340 is determined, as the property, to be a composite area including a photograph area and a plain area.

Here, in the example illustrated in FIG. 4, by the processing (steps S206 to S212) performed by the property determination processing module 165, the area 310 is determined to be a plain area, the area 320 is determined to be a photograph area, and the area 340 is determined to be a composite area. Then, the area 340 is transmitted to the area determination module 170.

In step S214, the area determination module 170 identifies a plain portion of the composite area. Obviously, the area determination module 170 may identify a photograph portion of the composite area or both the plain portion and the photograph portion of the composite area. In the example illustrated in FIG. 4, the area determination module 170 identifies a plain portion of the composite area on the basis of the candidate for a plain area determined in step S210 and generates plain area information 410. Then, the area determination module 170 identifies the other portion of the composite area as a photograph portion and generates photograph area information 420. The plain area information 410 is a mask used for extracting a plain area from the area 340. The photograph area information 420 is a mask used for extracting a photograph area from the area 340.

In step S216, the output module 180 outputs the result of the processing of step S212 or S214 or the results of the processing of both steps S212 and S214. Lastly, in step S299, the process ends.

Figure 11:
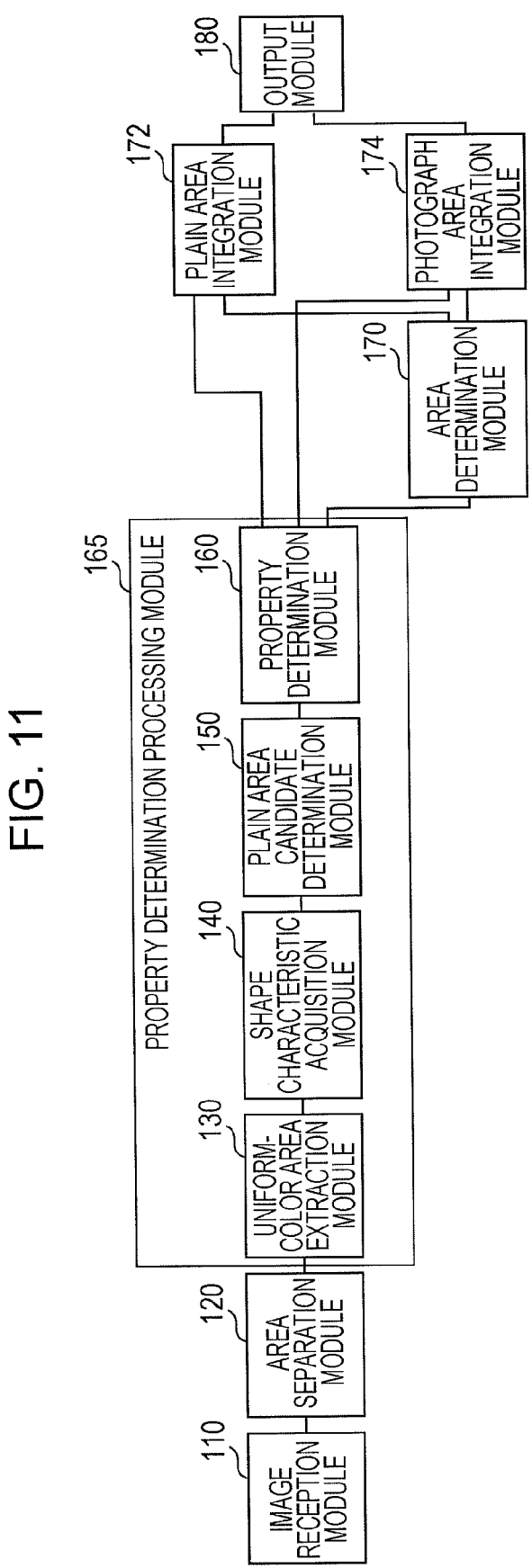
FIG. 11 is a schematic diagram illustrating an example of the module configuration according to a second exemplary embodiment.

FIG. 11 is a schematic diagram illustrating an example of the module configuration according to a second exemplary embodiment. In the second exemplary embodiment, plain areas are integrated and continuous-tone areas are integrated. As illustrated in FIG. 11, an image processing apparatus according to the second exemplary embodiment includes an image reception module 110, an area separation module 120, a property determination processing module 165, an area determination module 170, a plain area integration module 172, a photograph area integration module 174, and an output module 180. The property determination processing module 165 includes a uniform-color area extraction module 130, a shape characteristic acquisition module 140, a plain area candidate determination module 150, and a property determination module 160. The second exemplary embodiment is different from the first exemplary embodiment in that the plain area integration module 172 and the photograph area integration module 174 are further provided. Since the same types of component as those in the first exemplary embodiment are referred to with the same reference numerals, the explanations of those components will be omitted.

The property determination module 160 is connected to the plain area candidate determination module 150, the area determination module 170, the plain area integration module 172, and the photograph area integration module 174. The property determination module 160 transfers a plain area to the plain area integration module 172, transfers a continuous-tone area to the photograph area integration module 174, and transfers a composite area to the area determination module 170.

The area determination module 170 is connected to the property determination module 160, the plain area integration module 172, and the photograph area integration module 174. The area determination module 170 transfers a plain area in a composite area to the plain area integration module 172, and transfers a continuous-tone area in a composite area to the photograph area integration module 174.

The plain area integration module 172 is connected to the property determination module 160, the area determination module 170, and the output module 180. On the basis of an area identified as a plain area by the area determination module 170 and an area determined to be a plain area by the property determination module 160, the plain area integration module 172 integrates the plain areas in an image received by the image reception module 110.

The photograph area integration module 174 is connected to the property determination module 160, the area determination module 170, and the output module 180. On the basis of an area identified as a continuous-tone area by the area determination module 170 and an area determined to be a continuous-tone area by the property determination module 160, the photograph area integration module 174 integrates the continuous-tone areas in an image received by the image reception module 110.

The output module 180 is connected to the plain area integration module 172 and the photograph area integration module 174. The output module 180 outputs images obtained by integration performed by the plain area integration module 172 and the photograph area integration module 174. "Outputting an image" includes, for example, printing an image using a printing apparatus such as a printer, displaying an image on a display apparatus such as a display, transmitting an image using an image transmission apparatus such as a facsimile machine, writing an image into an image storage device such as an image database, storing an image on a storage medium such as a memory card, transferring an image to an external information processing apparatus, and the like.

Figure 12:
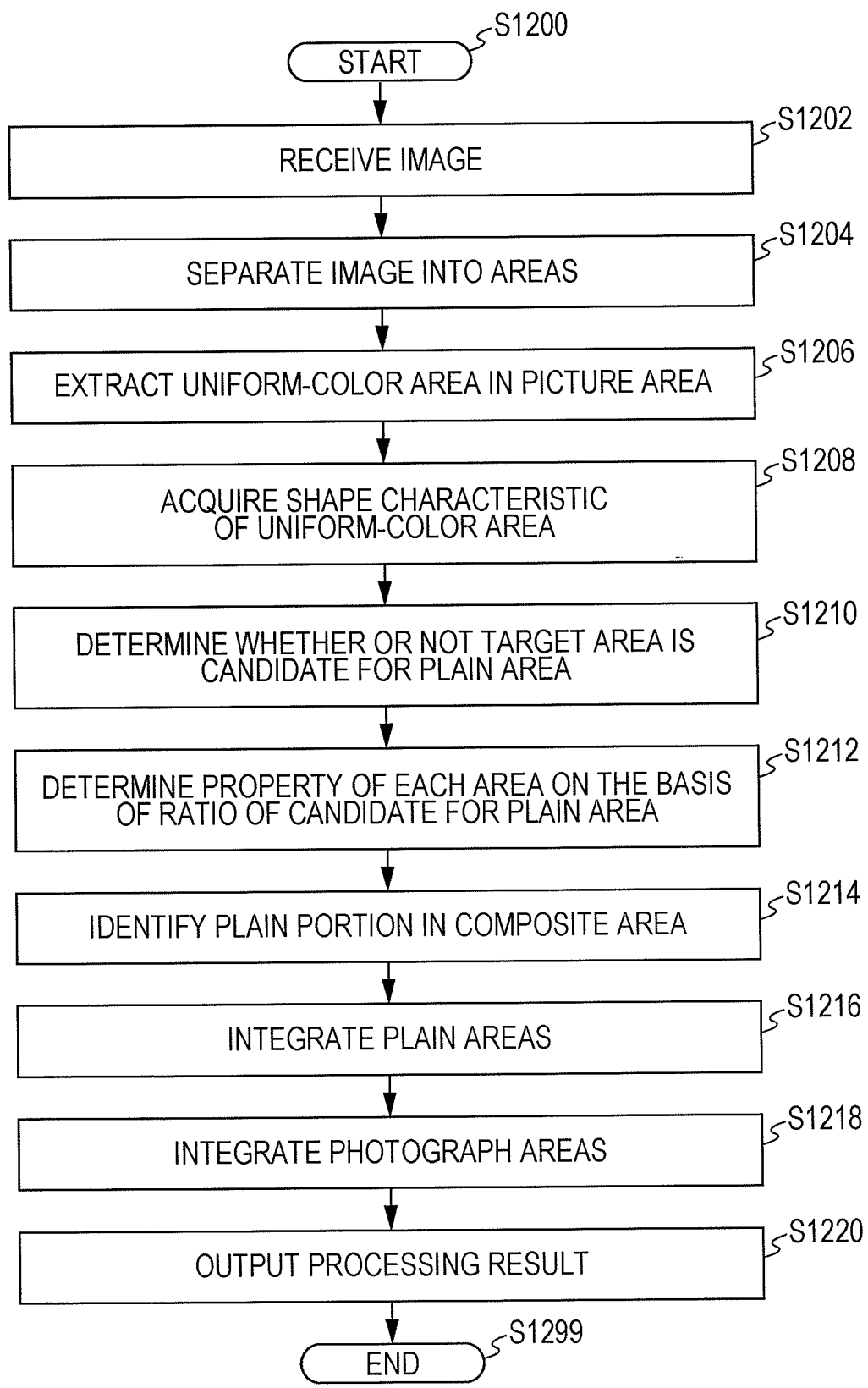
FIG. 12 is a flowchart illustrating an example of a process according to the second exemplary embodiment.

FIG. 12 is a flowchart illustrating an example of a process according to the second exemplary embodiment.

The processing from steps S1202 to S1214 is similar to the processing from steps S202 to S214 in the flowchart illustrated in FIG. 2.

Figure 13:
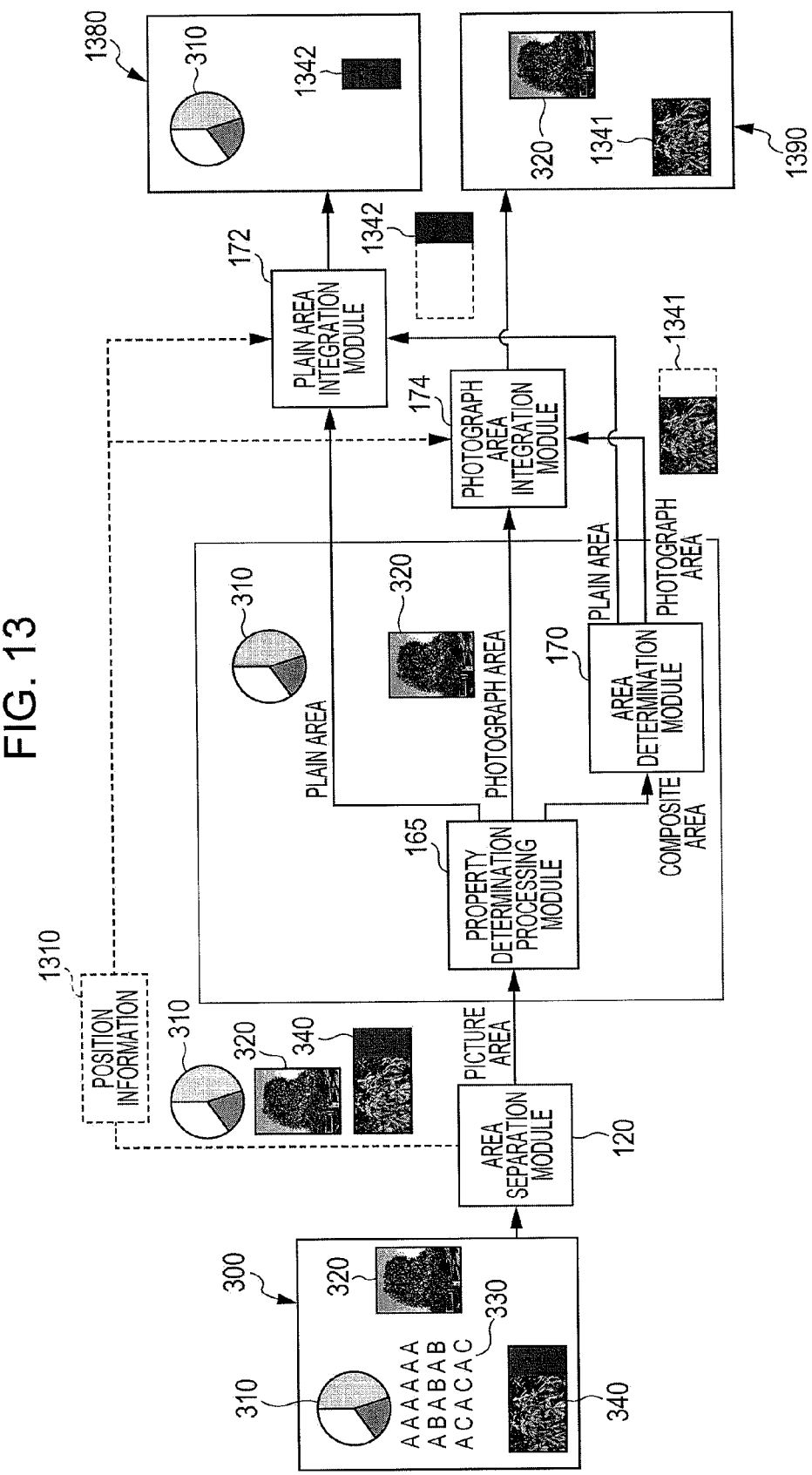
FIG. 13 is an explanatory diagram illustrating an example of the overview of the process according to the second exemplary embodiment.

In step S1200, the process starts. In step S1204, the area separation module 120 extracts position information of a separated area (information indicating the position of the area in a target image), as well as the processing of step S204. FIG. 13 is an explanatory diagram illustrating an example of the overview of the process according to the second exemplary embodiment. The area separation module 120 separates areas 310, 320, and 340 from a target image 300, extracts position information 1310 on the areas 310, 320, and 340, and transfers the extracted position information to the plain area integration module 172 and the photograph area integration module 174.

Figure 14:
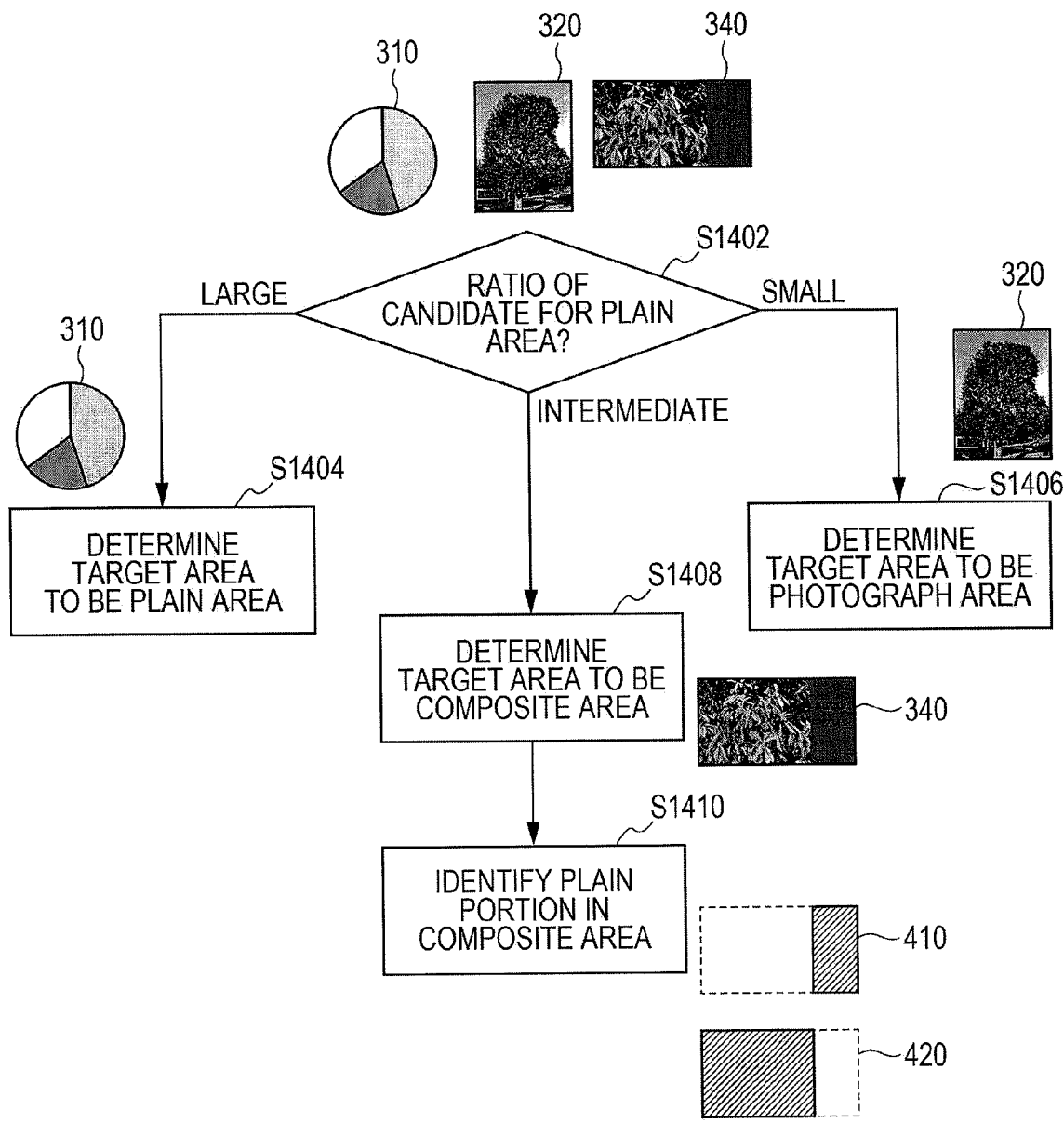
FIG. 14 is a flowchart illustrating an example of a process performed by a property determination module.

The processing of step S1212 will be explained with reference to a flowchart illustrated in FIG. 14. FIG. 14 is a flowchart illustrating an example of a process performed by the property determination module 160.

In step S1402, the ratio of a candidate for a plain area is determined. If it is determined in step S1402 that the ratio is equal to or greater than a predetermined value (a first threshold) (or greater than the predetermined value), the process proceeds to step S1404. If it is determined in step S1402 that the ratio is at an intermediate level (if the result does not correspond to S1404 or S1406), the process proceeds to step S1408. If it is determined in step S1402 that the ratio is smaller than or equal to a predetermined value (a second threshold) (or smaller than the predetermined value), the process proceeds to S1406.

In step S1404, the area is determined to be a plain area.

In step S1406, the area is determined to be a photograph area.

In step S1408, the area is determined to be a composite area.

In the example described above, the area 310 is determined, as the property, to be a plain area, the area 320 is determined, as the property, to be a photograph area, and the area 340 is determined, as the property, to be a composite area including a photograph area and a plain area.

In the example illustrated in FIG. 13, in the processing performed by the property determination processing module 165 (the processing from steps S1206 to S1212), the area 310 is determined to be a plain area, the area 320 is determined to be a photograph area, the area 340 is determined to be a composite area, and the area 340 is transferred to the area determination module 170.

In step S1410, a plain portion in the composite area is identified. That is, a plain area image 1342 is identified from the area 340 on the basis of plain area information 410, and a photograph area image 1341 is identified from the area 340 on the basis of photograph area information 420.

In step S1216, the plain area integration module 172 integrates the plain areas. In the example illustrated in FIG. 13, the plain area image 1342 is extracted from the area 340 on the basis of the plain area information 410, the area 310 and the plain area image 1342 are integrated using the position information 1310, and a plain area image 1380 is generated.

In step S1218, the photograph area integration module 174 integrates the photograph areas. In the example illustrated in FIG. 13, the photograph area image 1341 is extracted from the area 340 on the basis of the photograph area information 420, the area 320 and the photograph area image 1341 are integrated using the position information 1310, and a photograph area image 1390 is generated.

In step S1220, the output module 180 outputs a processing result. In the example illustrated in FIG. 13, the plain area image 1380 and the photograph area image 1390 are output. Then, in Step S1299, the process ends.

Figure 15:
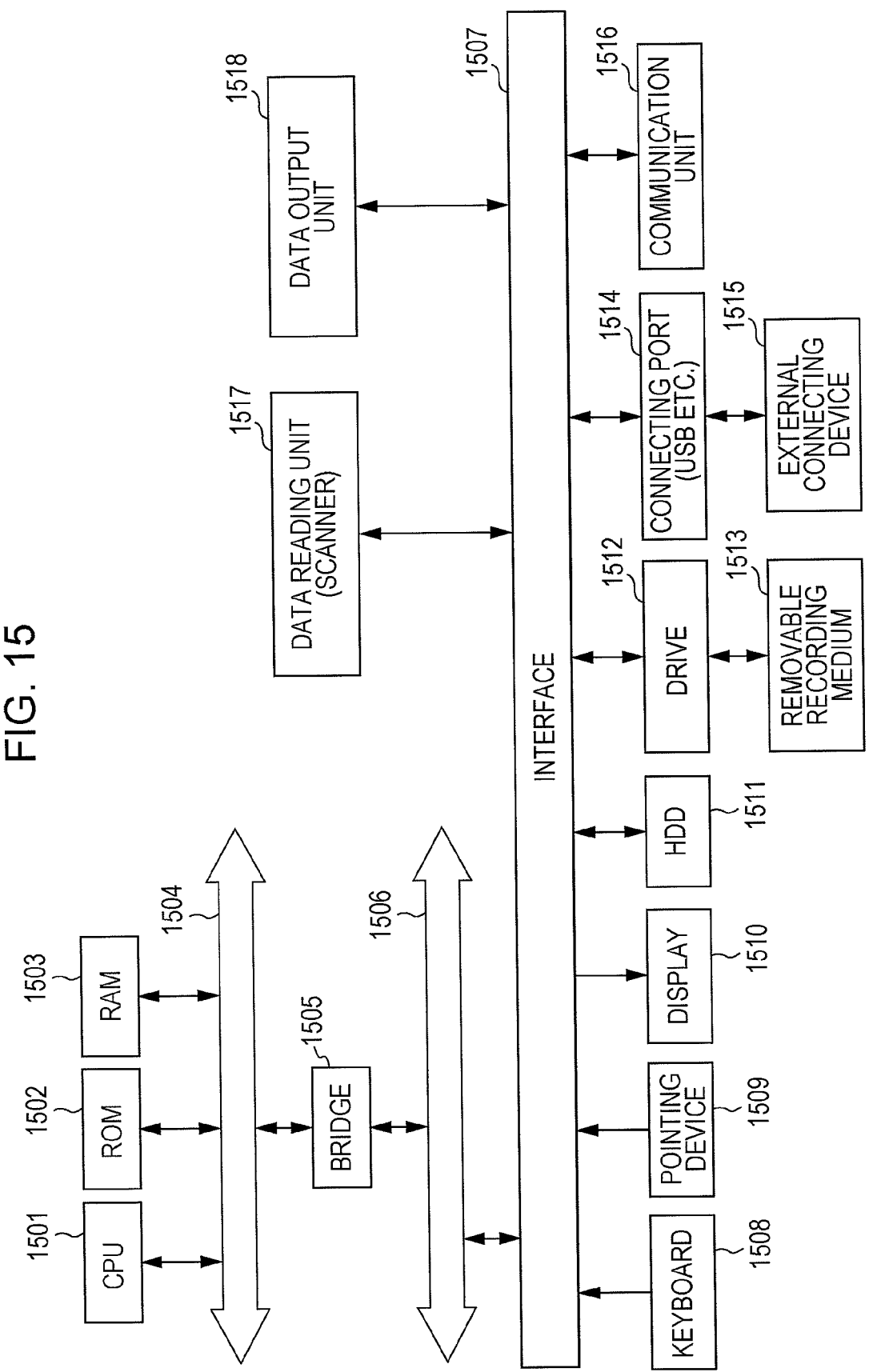
FIG. 15 is a block diagram illustrating an example of the hardware configuration of a computer implementing an exemplary embodiment.

An example of the hardware configuration of an image processing apparatus according to an exemplary embodiment will be described with reference to FIG. 15. The configuration illustrated in FIG. 15 includes, for example, a personal computer (PC) or the like. The configuration illustrated in FIG. 15 is an example of the hardware configuration including a data reading unit 1517 such as a scanner and a data output unit 1518 such as a printer.

A central processing unit (CPU) 1501 is a controller that executes processing in accordance with a computer program describing an execution sequence of various modules described in the foregoing exemplary embodiments, that is, modules such as the area separation module 120, the uniform-color area extraction module 130, the shape characteristic acquisition module 140, the plain area candidate determination module 150, the property determination module 160, the area determination module 170, the plain area integration module 172, and the photograph area integration module 174.

A read-only memory (ROM) 1502 stores a program, an arithmetic parameter, and the like used by the CPU 1501. A random-access memory (RAM) 1503 stores a program used by the CPU 1501, a parameter appropriately changing in accordance with the execution of the program, and the like. The ROM 1502 and the RAM 1503 are connected to each other via a host bus 1504 formed of a CPU bus or the like.

The host bus 1504 is connected to an external bus 1506 such as a peripheral component interconnect/interface (PCI) bus via a bridge 1505.

A keyboard 1508 and a pointing device 1509 such as a mouse are input devices operated by an operator. A display 1510 is a liquid crystal display device, a cathode ray tube (CRT) display device, or the like. The display 1510 displays various types of information as text or image information.

A hard disk drive (HDD) 1511 contains and drives a hard disk, and records or reproduces a program or information executed by the CPU 1501. Received images, areas, properties obtained as determination results, and the like are stored in the hard disk. Various computer programs such as other various data processing programs are also stored in the hard disk.

A drive 1512 reads data or a program recorded in a removable recording medium 1513 such as an installed magnetic disk, an optical disk, a magneto-optical disk, or a semiconductor memory, and supplies the read data or program to the RAM 1503 connected via the interface 1507, the external bus 1506, the bridge 1505, and the host bus 1504. The removable recording medium 1513 is usable as a data recording area similarly to a hard disk.

A connecting port 1514 is a port that allows connection to an external connecting device 1515 and includes a connecting portion such as a universal serial bus (USB), IEEE 1394, or the like. The connecting port 1514 is connected to the CPU 1501 and the like via the interface 1507, the external bus 1506, the bridge 1505, the host bus 1504, and the like. The communication unit 1516 is connected to a network and executes data communication processing with an external apparatus. The data reading unit 1517 is, for example, a scanner, and executes processing for reading a document. The data output unit 1518 is, for example, a printer, and executes processing for outputting document data.

The hardware configuration of the image processing apparatus illustrated in FIG. 15 is merely an example. The exemplary embodiment is not limited to the configuration illustrated in FIG. 15. Any configuration is possible as long as the modules explained in the exemplary embodiment can be implemented. For example, one or some modules may be configured using dedicated hardware (for example, an application specific integrated circuit (ASIC) or the like). One or some modules may be arranged in an external system connected via a communication line. Furthermore, the plural systems illustrated in FIG. 15 may be connected via a communication line so as to perform cooperative operations. In addition, the systems may be incorporated in a copying machine, a facsimile machine, a scanner, a printer, a compound machine (an image processing apparatus having two or more functions of a scanner, a printer, a copying machine, a facsimile machine, and the like), or the like.

The exemplary embodiments described above may be combined (for example, a module provided in an exemplary embodiment may be added to another exemplary embodiment, or a module provided in an exemplary embodiment may be exchanged with a module provided in another exemplary embodiment).

The property determination module 160 may determine the property of an area on the basis of a characteristic other than the characteristic relating to the shape of the area. The property determination module 160 may extract the likelihood of a first area being a continuous-tone area or being a plain area and determine, as the property, whether the first area is a continuous-tone area, a plain area, or a composite area including a continuous-tone area and a plain area, on the basis of the likelihood of being a continuous-tone area or the likelihood of being a plain area and the ratio of a second area. The characteristic amount relating to the likelihood of the first area being a continuous-tone area or being a plain area may be, for example, the histogram shape of pixel values, the edge pixel density, or the like of the first area.

More specifically, in a case where the likelihood of being a plain area is equal to or greater than a predetermined value (or greater than the predetermined value) and the ratio of the second area is equal to or greater than a first threshold (or greater than the first threshold), the target area is determined to be a plain area. In a case where the likelihood of being a continuous-tone area is equal to or greater than a predetermined value (or greater than the predetermined value) and the ratio of the second area is smaller than or equal to a second threshold (or smaller than the second threshold), the target area is determined to be a continuous-tone area. In other cases, the target area is determined to be a composite area.

Furthermore, the property determination module 160 may determine, as the property, whether the first area is a continuous-tone area, a plain area, or a composite area including a continuous-tone area and a plain area, on the basis of the characteristic amount relating to the likelihood of the first area being a continuous-tone area or being a plain area and change a predetermined value used in the determination based on the characteristic relating to the shape of the area, on the basis of the determination result. For example, the first threshold and the second threshold used in step S1002 or step S1402 in the flowchart illustrated in FIG. 10 or FIG. 14 are changed.

More specifically, for an area determined to be a plain area on the basis of the characteristic amount relating to the likelihood of the first area being a continuous-tone area or being a plain area, the first threshold is changed. That is, the first threshold is changed for each area, and the first threshold is changed to be smaller so that the determination to be a plain area can be easily made in the flowchart illustrated in FIG. 10 or FIG. 14. Changing the first threshold to be smaller means setting the value to be smaller than a first threshold used for other areas (areas each determined to be an area other than the plain area on the basis of the characteristic amount relating to the likelihood of the first area being a continuous-tone area or being a plain area).

For an area determined to be a continuous-tone area on the basis of the characteristic amount relating to the likelihood of the first area being a continuous-tone area or being a plain area, the second threshold is changed. That is, the second threshold is changed for each area, and the second threshold is changed to be larger so that the determination to be a continuous-tone area can be easily made in the flowchart illustrated in FIG. 10 or FIG. 14. Changing the second threshold to be larger means setting the value to be larger than a second threshold used for other areas (areas each determined to be an area other than the continuous-tone area on the basis of the characteristic amount relating to the likelihood of the first area being a continuous-tone area or being a plain area).

The plain area candidate determination module 150 may extract the likelihood of a second area being a continuous-tone area or being a plain area, which are other than the characteristic relating to the shape, and determine whether or not the second area is plain on the basis of the likelihood of being a continuous-tone area or the likelihood of being a plain area and the characteristic relating to the shape. The characteristic amount relating to the likelihood of the second area being a continuous-tone area or being a plain area may be, for example, the histogram shape of pixel values, the edge pixel density, or the like of the second area.

More specifically, in a case where the likelihood of being a plain area is equal to or greater than a predetermined value (or greater than the predetermined value) and the characteristic relating to the shape is simple (in the example illustrated in FIG. 9, the case where the process proceeds to step S904), the area is determined to be a plain area. In a case where the likelihood of being a continuous-tone area is equal to or greater than a predetermined value (or greater than the predetermined value) and the characteristic relating to the shape is complicated (in the example illustrated in FIG. 9, the case where the process proceeds to step S906), the area is determined to be a non-plain area.

Furthermore, the plain area candidate determination module 150 may determine whether or not the second area is plain, on the basis of the characteristic amount relating to the likelihood of the second area being a continuous-tone area or being a plain area. For example, a threshold used in step S902 in the flowchart illustrated in FIG. 9 is changed.

More specifically, for an area determined to be a plain area on the basis of the characteristic amount relating to the likelihood of the second area being a continuous-tone area or being a plain area, the threshold is changed. That is, the threshold is changed for each area, and the threshold is changed so that the determination to be a plain area can be easily made in the flowchart illustrated in FIG. 9.

The program described above may be stored in a recording medium to be supplied or may be supplied by a communication unit. In such a case, for example, the program described above may be regarded as being an invention relating to "a computer readable recording medium in which a program is recorded".

The "computer readable recording medium in which a program is recorded" is a computer readable recording medium in which a program is recorded, where the recording medium is used for installing the program, executing the program, circulating the program, or the like.

The recording medium is, for example, a digital versatile disc-recordable (DVD-R), a DVD-rewritable (DVD-RW), a DVD-RAM, or the like, which is developed by a DVD forum, a DVD+R, a DVD+RW, or the like, which is developed by DVD+RW, a compact disc read-only memory (CD-ROM), a CD-recordable (CD-R), a CD rewritable (CD-RW), a Blu-ray disc (registered trademark), a magneto-optical disk (MO), a flexible disk (FD), a magnetic tape, a hard disk, a read-only memory (ROM), an electrically erasable programmable read-only memory (EEPROM (registered trademark)), a flash memory, a random-access memory (RAM), or the like.

The program described above or part of the program described above may be recorded in the recording medium to be stored or circulated. In addition, the program may be transmitted via, for example, a local area network (LAN), a metropolitan area network (MAN), a wide area network (WAN), a wired or wireless network used for the Internet, intranet, extranet, or a transmission medium using the combination of some of the above-mentioned networks, or may be carried on a carrier wave.

Furthermore, the program described above may be part of a different program or may be recorded together with a different program in a recording medium. The program may be divided and recorded in plural recording media. The program may be recorded in any form as long as restoration, such as compression or encryption, can be performed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
at least one processor which executes:
a receiving unit that receives an image;
a separating unit that separates a first area from the image received by the receiving unit;
an extracting unit that extracts a second area of a color having a predetermined relationship in the first area separated by the separating unit;
an acquiring unit that acquires the characteristic relating to a shape of the second area extracted by the extracting unit;
a first determining unit that determines whether or not the second area is plain, on a basis of the characteristic acquired by the acquiring unit; and
a second determining unit that determines, as the property of the first area, whether the first area is a continuous-tone area, a plain area, or a composite area including a continuous-tone area and a plain area, on a basis of a ratio of the second area determined to be plain by the first determining unit to the first area separated by the separating unit,
wherein the acquiring unit acquires the characteristic relating to the shape of the second area by determining at least one difference between distances in neighboring neighboring peripheral pixels forming an outer periphery of the second area extracted by the extracting unit.

2. The image processing apparatus according to claim 1, further comprising an identifying unit that identifies a continuous-tone area and a plain area in the area determined to be the composite area including the continuous-tone area and the plain area by the second determining unit.

3. The image processing apparatus according to claim 2, further comprising:
   a plain area integration unit that integrates, on a basis of the area identified as a plain area by the identifying unit and the area determined to be a plain area by the second determining unit, the plain areas in the image received by the receiving unit; and
   a continuous-tone area integration unit that integrates, on a basis of the area identified as a continuous-tone area by the identifying unit and the area determined to be a continuous-tone area by the second determining unit, the continuous-tone areas in the image received by the receiving unit.

4. The image processing apparatus according to claim 1, wherein the second determining unit extracts a likelihood of the first area being a continuous-tone area or being a plain area, and determines, as the property of the first area, whether the first area is a continuous-tone area, a plain area, or a composite area including a continuous-tone area and a plain area, on a basis of the likelihood of being a continuous-tone area or the likelihood of being a plain area and the ratio.

5. The image processing apparatus according to claim 2, wherein the second determining unit extracts a likelihood of the first area being a continuous-tone area or being a plain area, and determines, as the property of the first area, whether the first area is a continuous-tone area, a plain area, or a composite area including a continuous-tone area and a plain area, on a basis of the likelihood of being a continuous-tone area or the likelihood of being a plain area and the ratio.

6. The image processing apparatus according to claim 3, wherein the second determining unit extracts a likelihood of the first area being a continuous-tone area or being a plain area, and determines, as the property of the first area, whether the first area is a continuous-tone area, a plain area, or a composite area including a continuous-tone area and a plain area, on a basis of the likelihood of being a continuous-tone area or the likelihood of being a plain area and the ratio.

7. An image processing method comprising:
   receiving an image;
   separating a first area from the received image;
   extracting a second area of a color having a predetermined relationship in the separated first area;
   acquiring a characteristic relating to a shape of the extracted second area;
   determining whether or not the second area is plain, on a basis of the acquired characteristic; and
   determining, as a property of the first area, whether the first area is a continuous-tone area, a plain area, or a composite area including a continuous-tone area and a plain area, on a basis of a ratio of the second area determined to be plain to the separated first area,
   wherein the acquiring the characteristic relating to the shape of the extracted second area comprises acquiring the characteristic relating to the shape of the extracted second area by determining at least one difference between distances in neighboring scanning operations, the distances are between neighboring peripheral pixels forming an outer periphery of the extracted second area.

8. A non-transitory computer readable medium storing a program causing a computer to execute a process comprising:
   receiving an image;
   separating a first area from the received image;
   extracting a second area of a color having a predetermined relationship in the separated first area;
   acquiring a characteristic relating to a shape of the extracted second area;
   determining whether or not the second area is plain, on a basis of the acquired characteristic; and
   determining, as a property of the first area, whether the first area is a continuous-tone area, a plain area, or a composite area including a continuous-tone area and a plain area, on a basis of a ratio of the second area determined to be plain to the separated first area,
   wherein the acquiring the characteristic relating to the shape of the extracted second area comprises acquiring the characteristic relating to the shape of the extracted second area by determining at least one difference between distances in neighboring scanning operations, the distances are between neighboring peripheral pixels forming an outer periphery of the extracted second area.

* * * * *